D. J. SCOTT.
OFFSET PERFECTING PRESS.
APPLICATION FILED APR. 2, 1915.

1,272,128.

Patented July 9, 1918.
11 SHEETS—SHEET 4.

INVENTOR
David J Scott
BY
ATTORNEY

D. J. SCOTT.
OFFSET PERFECTING PRESS.
APPLICATION FILED APR. 2, 1915.

1,272,128.

Patented July 9, 1918.
11 SHEETS—SHEET 6.

Fig. 7.

INVENTOR
David J Scott
BY
*[signature]*
ATTORNEY

D. J. SCOTT.
OFFSET PERFECTING PRESS.
APPLICATION FILED APR. 2, 1915.

1,272,128.

Patented July 9, 1918.
11 SHEETS—SHEET 7.

INVENTOR
David J. Scott
BY
*Attorney signature*
ATTORNEY

UNITED STATES PATENT OFFICE.

DAVID J. SCOTT, OF PLAINFIELD, NEW JERSEY, ASSIGNOR TO ISABELLA SCOTT AND DAVID J. SCOTT, EXECUTORS OF WALTER SCOTT, DECEASED, OF PLAINFIELD, NEW JERSEY.

OFFSET PERFECTING-PRESS.

1,272,128.  Specification of Letters Patent.  Patented July 9, 1918.

Application filed April 2, 1915. Serial No. 18,639.

*To all whom it may concern:*

Be it known that I, DAVID J. SCOTT, a citizen of the United States, and a resident of Plainfield, in the county of Union and State of New Jersey, have invented certain new and useful Improvements in Offset Perfecting-Presses, of which the following is a specification.

The present invention relates generally to offset perfecting presses and has more particularly reference to the general arrangement of the printing units composing such presses.

As is well known in the art, an offset press is a machine in which a positive design is carried by a form cylinder, is printed on a transfer surface such as a rubber blanket held on a blanket cylinder, and in turn printed from the rubber blanket on paper, fabric or metal carried on a third cylinder known as the impression cylinder.

In printing upon both sides of sheets or webs, however, it has been general practice to omit the impression cylinder, the blanket cylinder being used in two capacities i. e. that of a transfer cylinder and that of an impression cylinder. For instance, offset perfecting presses have been built consisting of four cylinders, two form-carrying cylinders and two combination blanket and impression cylinders, the design being printed from the form-carrying cylinders against the blankets on the blanket cylinders, and the two blanket cylinders coöperating to produce a simultaenous impression upon each side of the material. This method is objectionable because the rubber blankets are likely to be uneven in thickness and it is, therefore, as is well known, sometimes necessary to underlay or build up beneath them which is likely to produce inequalities in height. The form also has occasional high and low places and in printing between two yielding surfaces, such as the rubber blankets above mentioned, the quality of the work suffers since it is difficult to obtain a uniform impression on both sides of the material.

Another type of perfecting press is one composed of three cylinders, one of which carries a positive form and transfers this form to a rubber blanket carried by another of the cylinders, which in turn transfers it to the material, the third cylinder carrying a reversed form for printing directly on the material. This, of course, is not an offset perfecting method, since but one side of the sheet or web is printed by offsetting, the other side being printed direct from the plate and is objectionable because printing produced by the offset method has characteristics readily distinguishable from that direct from a plate and therefore the two sides of the sheet or web do not present exactly the same appearance. Furthermore, such a method necessitates reversal of half of the forms.

Heretofore, in offset printing the main obstacle encountered has been the difficulty in producing in a compact structure an arrangement of printing units each composed of three cylinders whereby both sides of the material may be printed by the same method and in which the various parts of the machine may be readily accessible during operation, the latter being important, since both the form-carrying and blanket cylinders require frequent and careful attention.

The main object of this invention is to produce such an arrangement of printing units as will overcome the above-mentioned objections. To this end a machine is provided in which both sides of the sheet or web are printed by the offset process, and without the omission of elements necessary to produce high class results; and in which the arrangement of cylinders is such that the working parts will, during its operation, be readily accessible. Another object of the invention is to provide means for conveniently controlling the various instrumentalities that make up the press.

In the accompanying drawings the invention is disclosed in several preferred forms, in which however, changes may be made without departing from the legitimate and intended scope of the invention.

In the said drawings:

Fig. 3 is a diagram of another form of the invention in which the arrangement of the cylinders is reversed from that shown in Figs. 1 and 2 and disclosing the use of a former folder for the printed product.

Similar characters of reference indicate corresponding parts in the different views.

Figure 10:
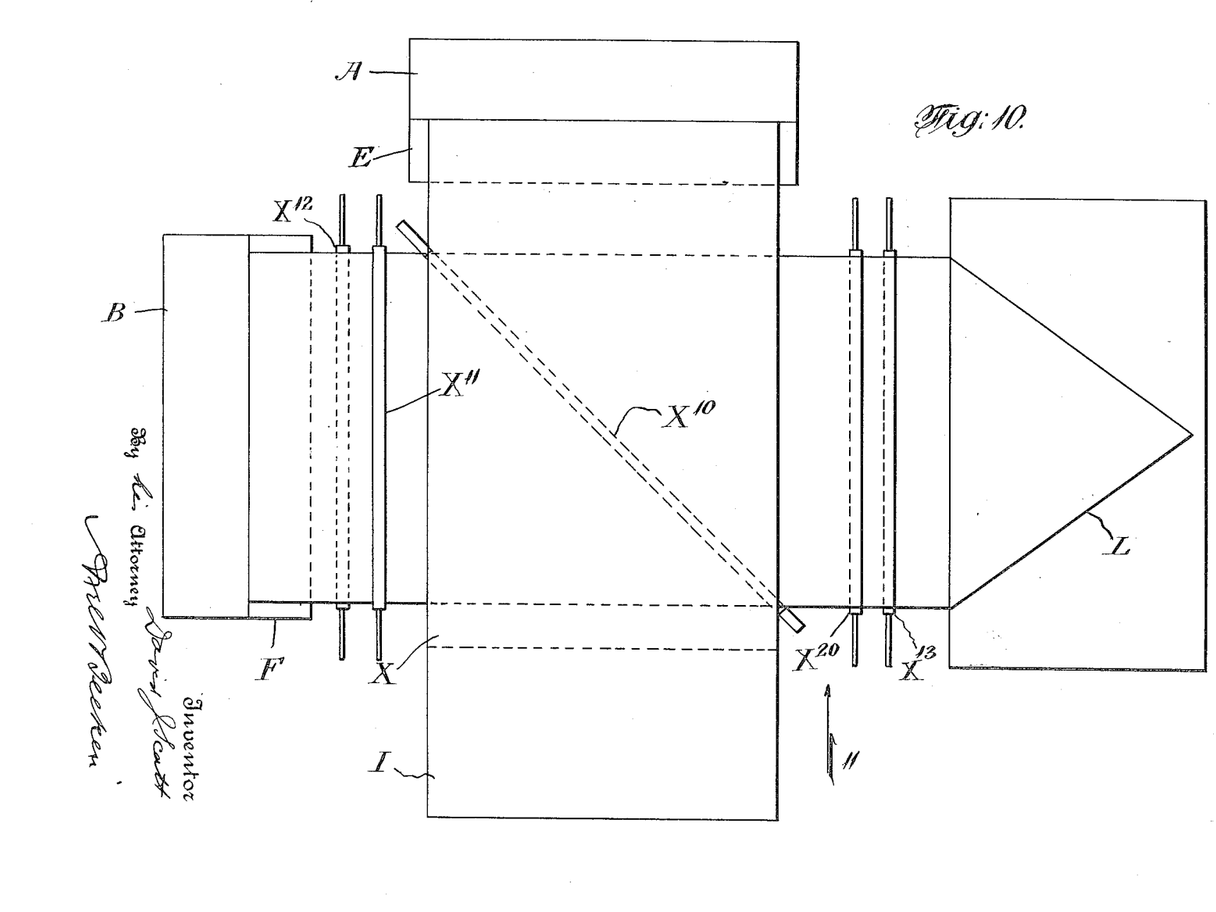
Fig. 10 is a diagrammatic view, in plan, showing a modification in which the two units are arranged at right angles to each other.
Figure 11:
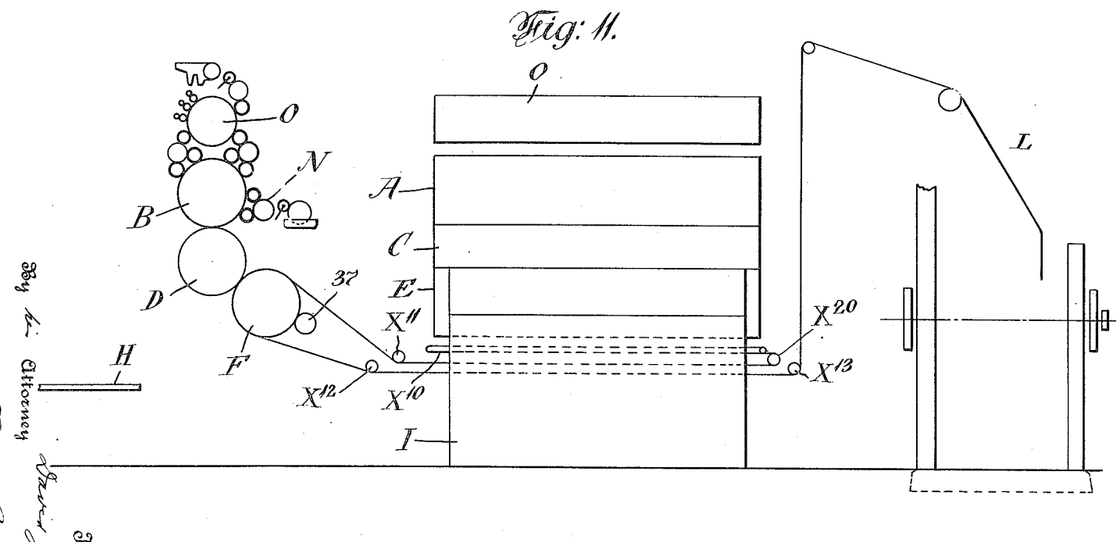
Fig. 11 is a view looking in the direction of arrow 11 of Fig. 10.
Figure 12:
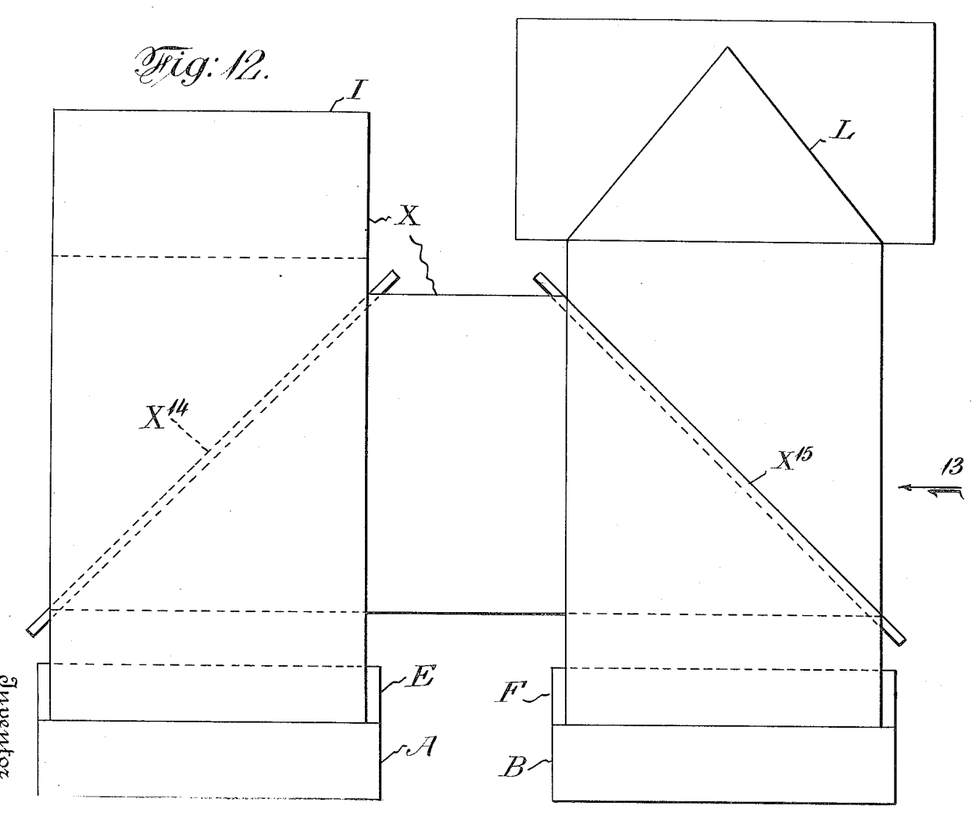
Fig. 12 is a diagrammatic view, in plan, of a further modification showing the units with their cylinders end to end.
Figure 13:
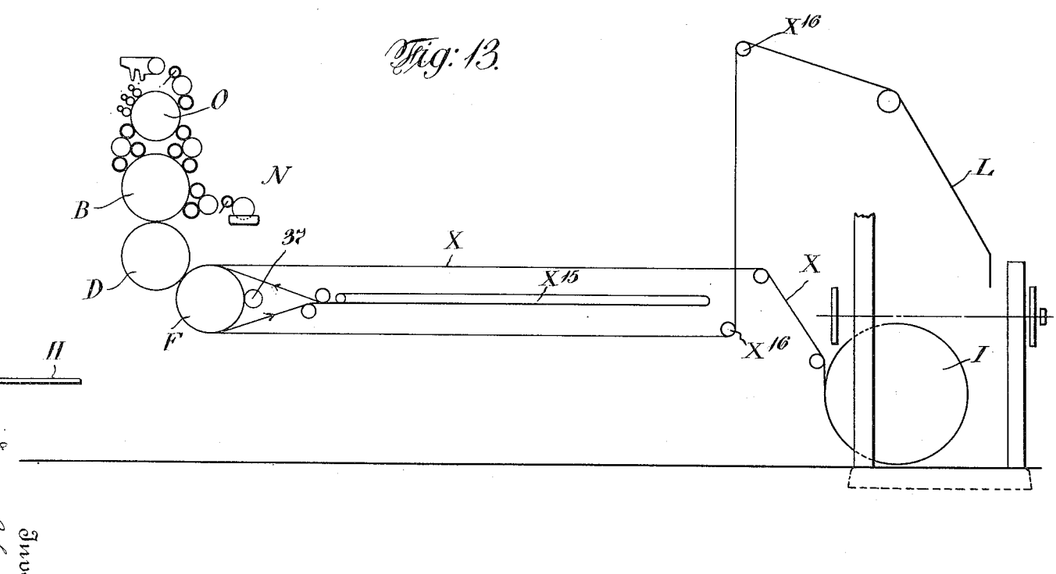
Fig. 13 is a view looking in direction of the arrow 13 of Fig. 12.

The construction shown in Fig. 3 of the drawings of this application is specifically claimed in my application Ser. No. 122,833, filed Sept. 29, 1916; that shown in Figs. 4 and 5 of this application is specifically claimed in my application Ser. No. 122,834 filed Sept. 29, 1916; that of Fig. 6 of this application is specifically claimed in my application Ser. No. 122,835, filed Sept. 29, 1916; that of Figs. 10 and 11 is specifically claimed in my application Ser. No. 122,836 filed Sept. 29, 1916; and that of Figs. 12 and 13 is specifically claimed in my application Ser. No. 122,837 filed Sept. 29, 1916.

Figure 2:
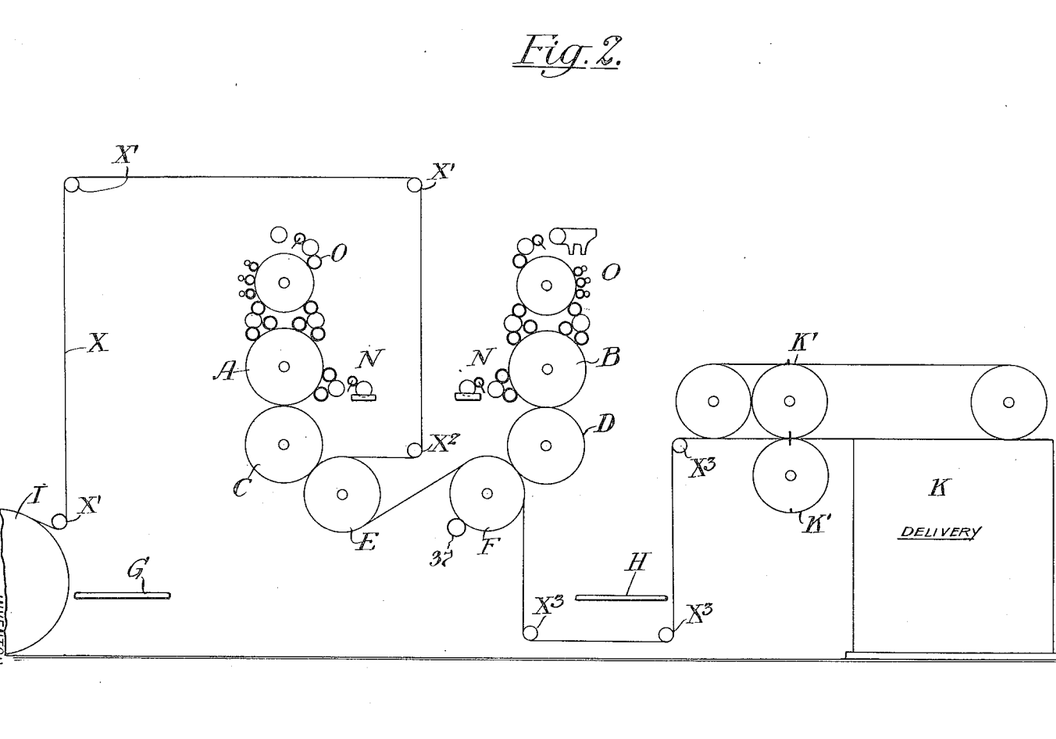
Fig. 2 is a diagram representing substantially the structure shown in Fig. 1 and disclosing also the web feeding roll and cutting and delivery mechanism.

In the exemplification shown in Fig. 2, A, C and E represent respectively the plate, the blanket and the impression cylinders of one couple or unit, while B, D and F represent respectively the plate, the blanket and the impression cylinders of the second printing couple. The plate cylinders carry positive forms. It will be observed that in the present instance the plate and blanket cylinders are arranged outermost of the structure, while the two impression cylinders E and F are arranged innermost and comparatively close together. The plate cylinders A and B are here shown as being uppermost in each couple with the blanket cylinders C and D directly below, while the impression cylinders E and F are lowermost of all and closer together. O indicates the usual inking apparatus and N water rollers that may or may not be employed. Arranged on the outer sides of the two units are the platforms G and H by means of which the operator may have ready access to the plate and blanket cylinders of the two units. The paper feeding and delivery mechanisms are located on opposite sides of the two units, the paper roll I being adjacent to the outer side of the first printing couple, and the delivery K, here, for convenience, indicated as a flat delivery, being located on the outside of the second printing couple. The web X is led from a roll I over guide rollers X' above one unit to a point intermediate the two units, then downwardly around a guide roller $X^2$ to impression cylinder E of the first unit, and then back across the space between the two units to impression cylinder F of the second unit, from whence it passes over suitable guide rollers $X^3$ beneath said second unit out of the machine. Before it reaches delivery K the web may pass between cutting cylinders K', which sever it into sheet lengths in a known manner.

In Fig. 3 the arrangement of cylinders is reversed in that plate cylinders A and B are lowermost, blanket cylinders C and D being next in substantially the same vertical plane as the plate cylinders, and finally the impression cylinders E and F, located uppermost. As before, the plate and blanket cylinders are located outermost, while the impression cylinders are located innermost. The web here passes from roller I over guide rollers X' beneath one unit to a point midway between the two units of the machine but at the lower end thereof, thence upwardly over the guide roller $X^2$ to impression cylinder E of the other unit, then back across the space between the two units to impression cylinder F of the first unit, and thence over guide roller $X^3$ above said other unit to a suitable delivery, here shown as a former folder L.

Figure 4:
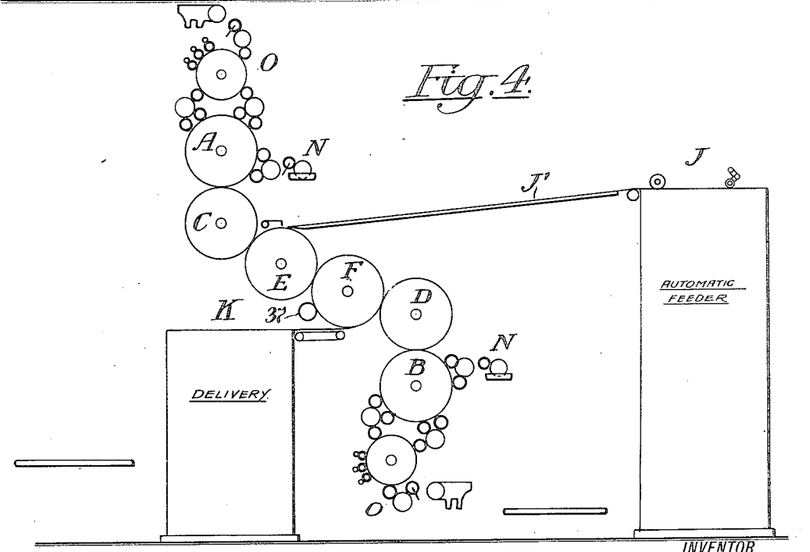
Fig. 4 is a diagrammatic view of still another modification showing a sheet fed press with a flat delivery.

In the modification shown in Fig. 4, an automatic feeder J of conventional construction is disclosed feeding sheets over a feed board J' to the first impression cylinder E, and thence to the second impression cylinder F, and after that to delivery K. Here the invention is still further modified by having the plate and blanket cylinders of the first impression couple above impression cylinder E, while the plate and blanket cylinders of the second printing couple are below the second impression cylinder F. In this instance, however, it will be observed that the plate and blanket cylinders of the two couples are still outermost, while the impression cylinders are innermost of the structure.

Figure 5:
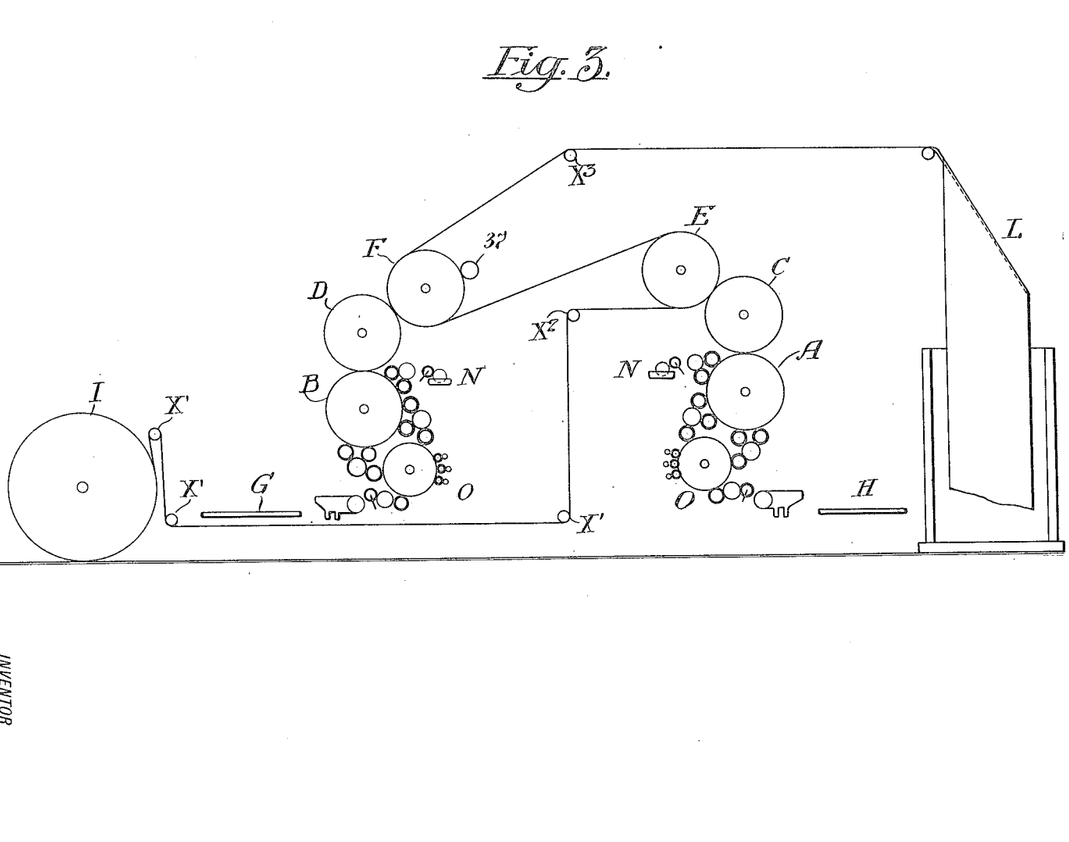
Fig. 5 is a diagrammatic view showing substantially the same form as that disclosed in Fig. 4 in connection with a sheet feeding device cutting from a roll of paper and provided with a folding mechanism and delivery.

In Fig. 5 we have substantially the same arrangement as shown in Fig. 4 except that the impression cylinders of the two couples are brought nearly to the level with respect to each other. Here the sheet is fed from a web I and passes through cutting cylinders M of a known type, such as the all size rotary cutters, thence over a sheet path M' to a feeding cylinder M², and thence to impression cylinders E and F. After the sheet has been printed on both sides, it is delivered between folding cylinders M³ and M⁴, which deposit the folded sheets on a rotary delivery 2 that in turn feeds them to an apron L'.

Figure 6:
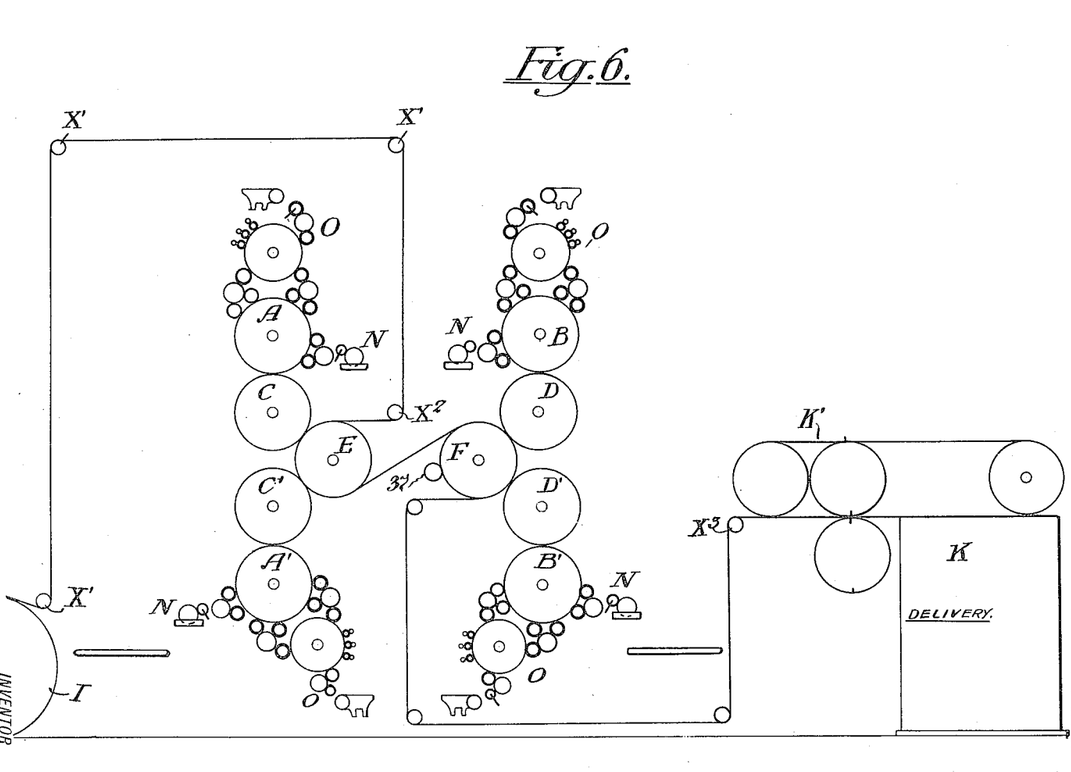
Fig. 6 is a diagrammatic view showing substantially the same form of the invention as that disclosed in Fig. 2, with a multicolor attachment for each side of the web or sheet.

In Fig. 6 substantially the same arrangement as shown in Fig. 2 is disclosed except that there is an extra set of blankets and of plate cylinders C', D', A' and B' in connection with the two impression cylinders so that the sheet or web may be printed on both sides in two colors.

In each case the plate cylinders are shown in connection with a dampening attachment N and an inking attachment O. It will be understood, of course, that while the commercial offset press is a lithographic machine usually carrying the design on zinc or aluminum plates that are dampened and inked after each impression, the invention is not limited to the use of a lithographic or planographic press, and if form carrying cylinders A and B are arranged to take on electrotype or other relief printing plates, the dampening mechanism would be omitted. It will also be understood that if desired, an intaglio plate cylinder may be substituted for the planographic or relief printing cylinder, and this intaglio cylinder may be supplied with an inking and wiping device, as is well understood in the art. None of these features affect the design of the press or the invention thereof.

It will, of course, also be understood that folder L shown in Fig. 3 could be substituted for the cutter and delivery shown in Fig. 2; that is to say, the representation of feeding, folding and delivering means in connection with each form is entirely typical and one form may be substituted for another. Applicant desires this to be distinctly understood as, to avoid undue multiplicity of drawings every modification possible within the scope of the invention has not been individually illustrated or shown in the drawings.

Turning now from the diagrammatic views to the more concrete form of the invention disclosed in Figs. 1, 7, 8 and 9, it will be noted that blanket cylinders C and D and impression cylinders E and F are each mounted in sliding boxes. These sliding boxes are all of substantially the same construction and only one need be described.

Figures 8, 9:
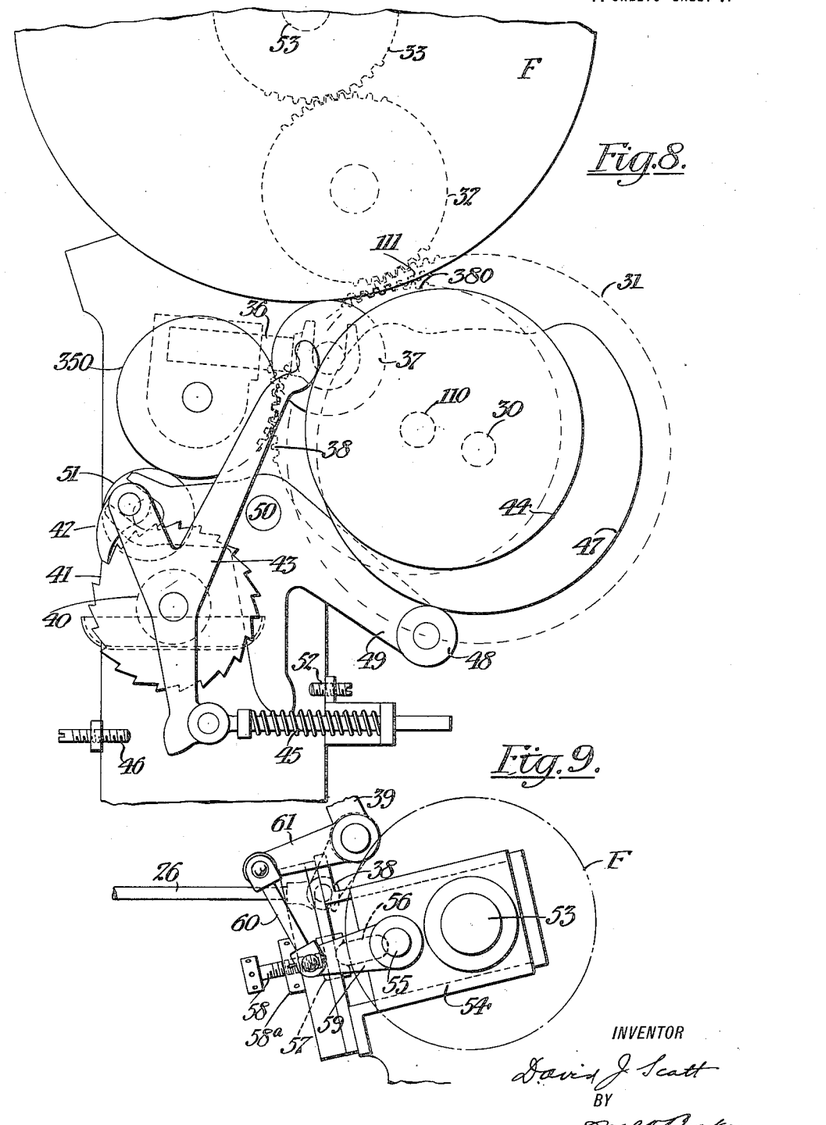
Fig. 8 is a detail view of the means for preventing smutting of the printed side of the sheet or web on the second impression cylinder.
Fig. 9 is a detail view of one of the throw-offs of the blanket or impression cylinders.

Referring to Fig. 9, 53 indicates the shaft of impression cylinder F which is mounted in the rectangular sliding box 54. This sliding box carries a shaft 55 that is milled out on one side, as shown, to receive a toggle link 56 that is mounted at its other end on a block 57. The block 57 is adjusted in the framing by means of an adjusting screw 58 and lock nut 58ᵃ. On the end of shaft 55 is an operating lever 59 having secured at its outer end a connecting rod 60 extending to a bell crank 61.

Figure 1:
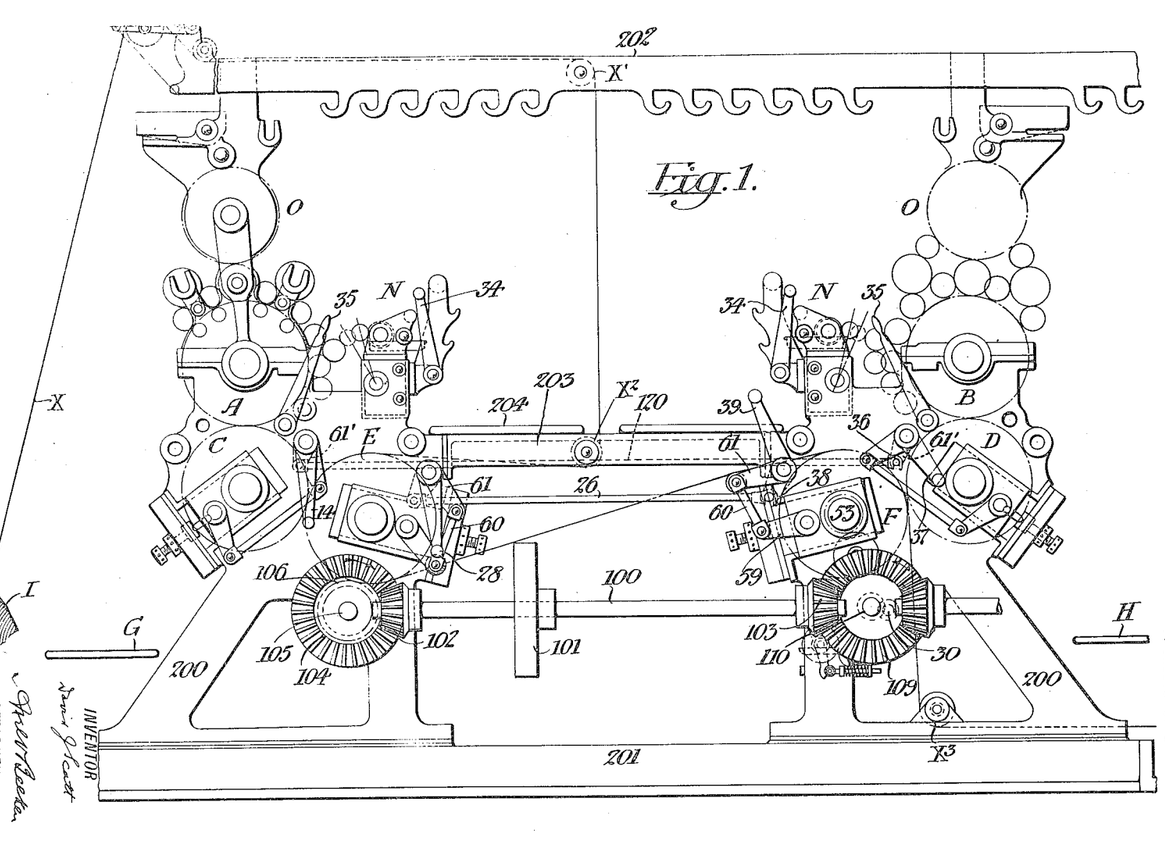
Figure 1 is a side elevation of an offset web perfecting press embodying one form of the invention.

Referring now to Fig. 1, it will be noted that there is a similar bell crank 61 and train of connections adjacent to impression cylinder E and that adjacent to blanket cylinders C and D there are similar bell cranks 61' and a similar train of connections. Each bell crank is provided with a handle indicated respectively at 14, 28, 39 and 37. Extending between bell cranks 61 of the impression cylinders is a rod 26 disconnectable from one of said bell cranks by reason of a hook 38. When the hook is in position, manipulation of either one of the handles 39 or 28 will trip both impression cylinders toward each other and away from their complementary blanket cylinders. If hook 38 is disconnected, each impression cylinder may be tripped independently of the other. Similarly, there is a rod 120 that extends across the machine between bell cranks 61' of the two blanket cylinders. This likewise has a hooked connection 36 at one end so that, when in position, manipulation of handle 37 or 14 will trip both blanket cylinders away from the plate and impression cylinders; and when hooked connection 36 is disconnected each of said blanket cylinders may be tripped independently of the other.

Preferably each of the plate cylinders is provided with a throw-off for the inking device O and a throw-off for the water or dampening devices N. The ink throw-off is operated by levers 35 while the water throw-off is operated by levers 34.

Figure 7:
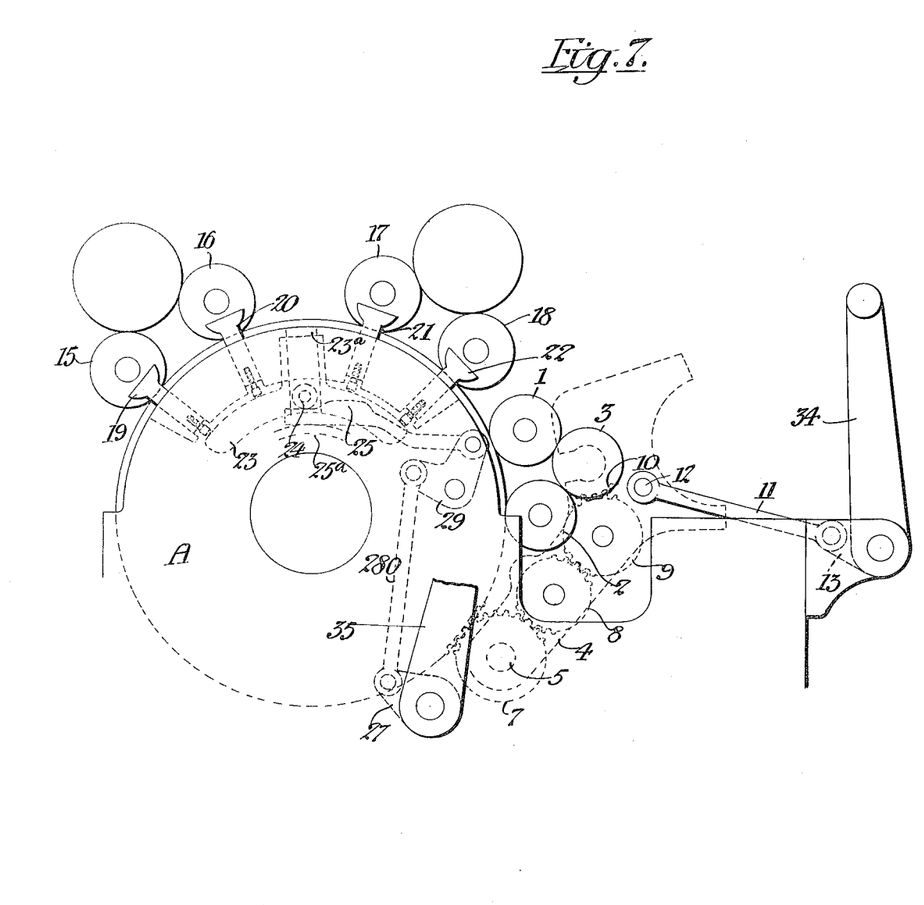
Fig. 7 is a detail view of one of the inking roller and water roller throw-offs.

Referring to Fig. 7 there is shown a detail view of these throw-offs in connection with the plate cylinder A.

The water form rollers 1 and 2 and the water distributing roller 3 are carried in a pair of frames 4 journaled on studs 5. The rollers 1 and 2 are mounted in adjustable sockets in the usual manner. Roller 3 is not adjustable so far as its position with relation to the form rollers is concerned, but it is driven from the gear on plate cylinder A by means of a gear 7 located in stud 5 and by means of intermediate gears 8 and 9 and gear 10 on distributing roller 3. The entire dampening mechanism is therefore pivoted on stud 5 and is held in position by means of link 11 secured to the frames 4 at 12 and is operated by a lever 13 mounted on a cross-shaft and connected to operating handle 34.

It will be noted that when links 11 and 13 are straightened, as shown in Fig. 7, they act as a toggle to lock the parts in position.

15, 16, 17 and 18 are four ink form rollers mounted in the usual open sockets, not shown, and are adjusted to the form. Located to slide in the frame are roller lifters 19, 20, 21 and 22 which are arranged to contact with the shanks of the form rollers and are shown dropped away from these rollers. The lower ends of these lifters are arranged to contact with the segment 23 that slides vertically on slide 23$^a$ and is provided with a cam roller 24 at its lower end which is actuated by cam 25. Cam 25 rests on a projection 25$^a$ in the frame and is operated from hand lever 35 by means of operating lever 27, connecting rod 280 and bell crank 29. It will be observed that by pulling hand lever 35, sliding cam 25 will connect with cam roll 24 and raise segment 23, which, in turn, actuates lifters 19, 20, 21 and 22 and thereby rolls 15, 16, 17 and 18.

In order to prevent that side of the web which has been first printed from smutting the surface of the second impression cylinder F, a suitable substance is applied to the surface of said cylinder F by the following means (see Fig. 8): 30 is a cam shaft located below the second impression cylinder F and provided with a gear 31 driven by an intermediate gear 32 receiving its power from gear 33 on the end of shaft 53 of cylinder F. 350 is the oil distributing drum that carries adjustable lever 36 which holds the oil applying roller 37. The oil distributing drum 35 carries a gear driven by an intermediate gear 380 which, in turn, receives its power from shaft 110. 40 is the oil fountain roller provided with a ratchet 41 operated by a pawl 42 carried by cam lever 43, the point of which runs on an eccentric 44. The eccentric serves to push lever 43 positively in one direction while spring 45 compels lever 43 to follow the eccentric as it moves away. 46 is a screw stop, that may be adjusted to limit the motion of the lever 43, thereby feeding more or less oil. 47 is a ductor cam against which runs cam roller 48 which latter is mounted on a lever 49 pivoted at 50 and carrying an oil ductor roller 51 on which travels oil from the fountain roller 40 to distributing roller 35. The adjustable stop 52 is provided to adjust the contact of the ductor roller with the oil fountain roller.

To drive the two units in synchronism, a power shaft 100 extends from one to the other and is provided with a pulley 101 or with other means for applying power to said shaft. At opposite ends of this shaft are bevel gears 102 and 103, the bevel gear 102 meshing with a bevel gear 104 on a shaft 105 which, in turn, is provided with a gear 106 imparting motion to impression cylinder E. From the latter, motion is transmitted to the other devices of that printing couple in the usual manner. A bevel gear 103 meshes with a bevel gear 109 mounted on the shaft 110 adjacent to impression cylinder F. Mounted on shaft 110 is a gear 380 which meshes with a gear 111 on impression cylinder F from which motion is imparted to the remaining elements of that printing couple in the usual manner.

The two units are mounted in uprights 200, that are connected by a base member 201 and the top connecting member 202, as well as bridge 203. The bridge 203 carries platforms 204.

In the modification shown in Figs. 10 and 11, two units, constructed as before, are shown located at right angles to each other, the source of supply of impression receiving material I and the delivery mechanism, here shown as a former folder L, being also located at right angles to each other and the two units and the source of supply and the delivery mechanism constituting the four sides of a square. In this form of the invention, the impression receiving material X, coming from the source I, passes across to impression cylinder E of the first unit, and around the same and back to a turner bar X$^{10}$ where it is given a quarter turn and passes thence by way of rollers X$^{20}$ and X$^{11}$ to impression cylinder F of the second unit and around it to a roller X$^{12}$ and thence across to the rollers X$^{13}$ to the delivery.

In the modification shown in Figs. 12 and 13, the two units are constructed in exactly the same manner as before and are arranged with their cylinders end to end, as shown in Fig. 12. Here the source of supply of impression receiving material I is located opposite to the first unit while the delivery mechanism, here shown as a former folder L, is located opposite to the other unit, the source of supply and the folder being adjacent to each other. The impression receiving material X here passes from the source I across to impression cylinder E of the first unit and around it, thence to a turner bar X$^{14}$, where it is given a quarter turn, and passes to a turner bar X$^{15}$ where it is again given a quarter turn. The paper thereafter passes to impression cylinder F of the second unit and around it, thence across the machine to a guide roller 16, and thence to the delivery.

It will be noted that while the invention herein has been disclosed in many forms, all of them possess the same characteristics in that the offset perfecting machine comprises a plurality of units, each unit consisting of a form carrying, a transfer and an impression member, the form carrying and transfer members forming an exposed operating side that is readily accessible to the operator for manipulation of the form and blanket members, and that, by reason of the fact that the impression cylinder is offset out of the vertical plane of the form carrying and transfer members, said impression member is located non-adjacent to the operating side, the units being, in each instance, grouped with their operating sides outermost and accessible from platforms G and H or other suitable gang-way. It will further be noted that in each instance the means for transferring the paper from the impression member of one unit to the impression member of another unit is located non-adjacent to the operating side of the machine.

What is claimed, is:

1. A rotary offset perfecting machine comprising: a plurality of units printing from positive forms on opposite sides of impression receiving material, each unit consisting of a form-carrying, a transfer and an impression cylinder all of substantially the same diameter, the form-carrying and transfer cylinders being arranged in an upright column, and the impression cylinder being arranged out of line with the other cylinders to afford an exposed operating side for the unit, said units being grouped with their operating sides outermost.

2. A rotary offset perfecting machine comprising: a plurality of units printing from positive forms on opposite sides of impression receiving material, each unit consisting of a form-carrying, a transfer and an impression cylinder all of substantially the same diameter, the form-carrying and transfer cylinders being arranged in an upright column, and the impression cylinder being arranged out of line with the other cylinders to afford an exposed operating side for the unit, said units being grouped with their operating sides outermost, and feeding and delivery mechanism associated with said units and located to afford unobstructed access to the operating sides.

3. A rotary offset perfecting machine comprising: a plurality of units printing from positive forms on opposite sides of impression receiving material, each unit consisting of a form-carrying, a transfer and an impression cylinder all of substantially the same diameter, the form carrying and transfer cylinders being arranged in an upright column, and the impression cylinder being arranged out of line with the other cylinders to afford an exposed operating side for the unit, said units being grouped with their operating sides outermost, and means for moving the transfer cylinder of each unit outwardly with respect to the operating side of said unit and away from the other cylinders of the unit.

4. A rotary offset perfecting machine comprising: a plurality of units printing from positive forms on opposite sides of impression receiving material, each unit consisting of a form-carrying, a transfer and an impression cylinder all of substantially the same diameter, the form-carrying and transfer cylinders being arranged in an upright column, and the impression cylinder being arranged out of line with the other cylinders to afford an exposed operating side for the unit, said units being grouped with their operating sides outermost, and means for moving the impression cylinder of each unit inwardly with respect to the operating side of said unit and away from the other cylinders of said unit.

5. A rotary offset perfecting machine comprising: a plurality of units printing from positive forms on opposite sides of impression receiving material, each unit consisting of a form-carrying, a transfer and an impression cylinder all of substantially the same diameter, the form carrying and transfer cylinders being arranged in an upright column, and the impression cylinder being arranged out of line with the other cylinders to afford an exposed operating side for the unit, said units being grouped with their operating sides outermost, means for moving the transfer cylinder of each unit outwardly with respect to the operating side of said unit and away from the other cylinder of the unit, and means for moving the impression cylinder of each unit inwardly with respect to the operating side of said unit and away from the other cylinders of said unit.

6. A rotary offset perfecting machine comprising: a plurality of units printing from positive forms on opposite sides of impression receiving material, each unit consisting of a form-carrying, a transfer and an impression cylinder all of substantially the same diameter, the form carrying and transfer cylinders being arranged in an upright column, and the impression cylinder being arranged out of line with the other cylinders to afford an exposed operating side for the unit, said units being grouped with their operating sides outermost, feeding and delivery mechanism associated with said units and located to afford unobstructed access to the operating sides, means for moving the transfer cylinder of each unit outwardly with respect to the operating side of said unit and away from the other cylinders of the unit, and means for moving the impression cylinder of each unit inwardly with respect to the operating side of said unit and away from the other cylinders of said unit.

7. A rotary offset perfecting machine comprising: a plurality of side by side units printing from positive forms on opposite sides of impression receiving material, each unit consisting of a form-carrying, a transfer and an impression cylinder all of substantially the same diameter, the form-carrying and transfer cylinders being arranged in an upright column and the impression cylinder being arranged out of line with the others to afford an exposed operating side for the unit, said units being grouped with their operating sides outermost and with their impression cylinders innermost.

8. A rotary offset perfecting machine comprising: a plurality of side by side units printing from positive forms on opposite sides of impression receiving material, each unit consisting of a form-carrying, a transfer and an impression cylinder all of substantially the same diameter, the form-carrying and transfer cylinders being arranged in an upright column and the impression cylinder being arranged out of line with the others to afford an exposed operating side for the unit, said units being grouped with their operating sides outermost and with their impression cylinders innermost, and means for leading a web in between the two units, thence to the impression cylinder of one unit and thence across from one unit to the impression cylinder of the other unit.

9. A rotary offset perfecting machine comprising: a plurality of side by side units printing from positive forms on opposite sides of impression receiving material, each unit consisting of a form-carrying, a transfer and an impression cylinder all of substantially the same diameter, the form-carrying and transfer cylinders being arranged in an upright column and the impression cylinder being arranged out of line with the others to afford an exposed operating side for the unit, said units being grouped with their operating sides outermost and with their impression cylinders innermost, a source of supply of impression receiving material adjacent to the outer side of one unit, and a delivery adjacent to the outer side of the other unit, both being in spaced relation to said outer sides to afford unobstructed access thereto.

10. A rotary offset perfecting machine comprising: a plurality of side by side units printing from positive forms on opposite sides of impression receiving material, each unit consisting of a form-carrying, a transfer and an impression cylinder all of substantially the same diameter, the form-carrying and transfer cylinders being arranged in an upright column and the impression cylinder being arranged out of line with the others and lowermost of said column to afford an exposed operating side for the unit, said units being grouped with their operating sides outermost and with their impression cylinders innermost, means for guiding a web above one unit, thence between the two units, thence to the impression cylinder of one unit, thence across from one unit to the impression cylinder of the second unit, and thence out underneath said second unit, and an anti-smutting device engaging with the impression cylinder of said second unit and located adjacent the lower part thereof.

11. A rotary offset web perfecting machine comprising: two side by side units adapted to print from positive forms on opposite sides of the web, each unit consisting of a form carrying, a transfer and an impression cylinder, the form carrying and transfer cylinders of each unit being located one above the other and outermost, with the form carrying cylinder uppermost, and the impression cylinders being arranged below the transfer cylinders and innermost of the machine, a web supply located adjacent to the outermost side of one of the units, a delivery located adjacent to the outermost side of the other unit, means for guiding the web from the source of supply above one unit, thence in between the two units, thence to the impression cylinder of one unit, thence across from one unit to the other to the impression cylinder of said other unit, thence underneath the said other unit to the delivery, uprights for supporting the elements of each unit, a bridge connecting the two units, and platforms on said bridge between the units.

12. An offset web perfecting machine comprising: two units, each including a form-carrying, a transfer, and an impression cylinder, means for leading a web to the impression cylinder of one unit, thence to and from the impression cylinder of the second unit, the web being substantially doubled back on itself in passing to and from the impression cylinder of the second unit, and an anti-smutting device engaging with the impression cylinder of the second unit and located intermediate the runs of the doubled back web.

Signed at New York city, in the county of New York and State of New York this 31st day of March A. D. 1915.

DAVID J. SCOTT.